United States Patent

[11] 3,613,944

[72] Inventors Philip B. Zeigler
Pittsford;
James C. St. Amand, Spencerport; Ernst L. Ranft, Webster, all of N.Y.
[21] Appl. No. 882,668
[22] Filed Dec. 5, 1969
[45] Patented Oct. 19, 1971
[73] Assignee General Motors Corporation
Detroit, Mich.

[54] SENSOR AND FRAGMENTIZABLE GLASS MEANS FOR RELEASING A PENETRATOR
9 Claims, 2 Drawing Figs.

[52] U.S. Cl. .................................................. 222/5
[51] Int. Cl. ..................................................... B67b 7/24
[50] Field of Search ......................................... 222/5;
141/19, 329, 330; 9/320, 119

[56] References Cited
UNITED STATES PATENTS
3,079,047 2/1963 Chiodini et al. ............... 222/5 X
3,490,649 1/1970 Sheridan ........................ 222/5

Primary Examiner—Stanley H. Tollberg
Attorneys—W. E. Finken and Herbert Furman

ABSTRACT: A sensor and trigger mechanism includes a ball of predetermined weight held against a pedestal-type seat by an adjustable screw. A sealed pressure vessel is biased axially toward a hollow penetrator pin and normally located in spaced relationship to the penetrator pin by a hollow frangible glass cylinder having a compressively stressed continuous outer surface skin or layer. A fragmentor pin is movably positioned to engage an outer edge of the glass cylinder to fragmentize the glass cylinder into segments and permit the seal of the vessel to be ruptured or penetrated by the penetrator pin so that the supply of pressure fluid within the cylinder can escape through the penetrator pin and into a manifold to inflate a restraint cushion. A spring member includes a first arm for engaging the fragmentor pin and a second arm which includes an integral detent portion for holding the first arm out of engagement with the fragmentor pin. The detent portion of the second arm is held in engagement with the first arm when the ball is seated. Upon application of a predetermined rate of acceleration change to the ball over a predetermined time duration, the ball slides off the seat and from underneath the adjustable screw to release the second arm and in turn release the first arm to engage the fragmentor pin and drive the pin into engagement with an outer edge of the cylinder to fragmentize the cylinder.

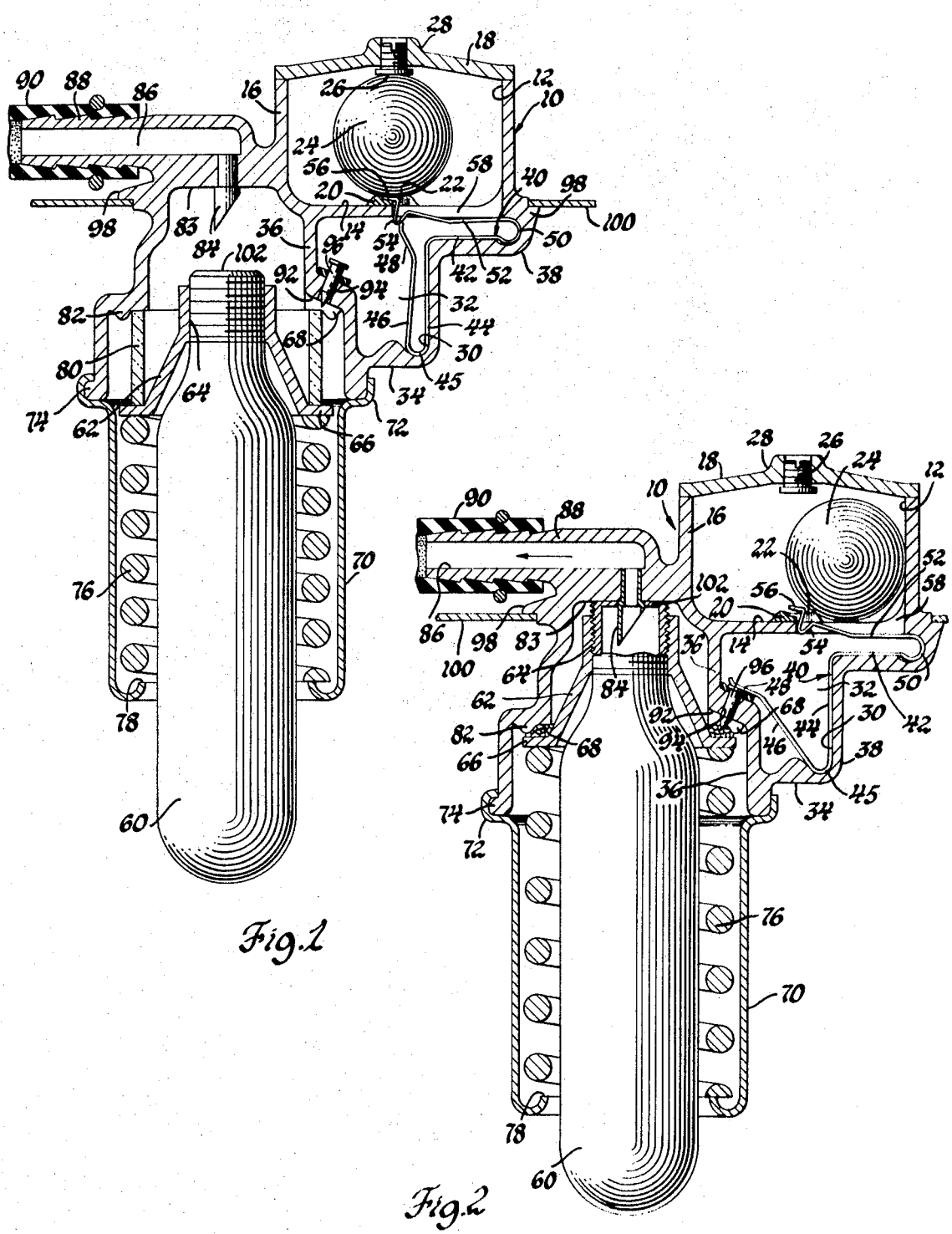

3,613,944

SENSOR AND FRAGMENTIZABLE GLASS MEANS FOR RELEASING A PENETRATOR

This invention relates generally to sensor and trigger mechanisms and more particularly to such mechanisms which sense a rate of acceleration change for a predetermined period of time and actuate a trigger to release a quantity of pressure fluid from a storage vessel.

The mechanism of this invention is particularly intended for use with inflatable restraint systems of the general type which include a sealed storage vessel of pressure fluid and a manifold connecting the vessel to a cushion which is inflated by the fluid when a certain rate of acceleration change is attained for a certain period of time. Generally the pressure vessel includes a rupturable or penetratable seal which must be broken in order for the pressure fluid to escape and inflate the cushion.

The sensor of this mechanism includes a ball of predetermined weight which is held against a pedestal-type seat with a predetermined force. When the rate of acceleration change reaches a predetermined minimum for a predetermined period of time, the ball is unseated.

The trigger includes a hollow cylindrical glass member which seats between movable and fixed members, one of which is a penetrator and the other of which is the sealed pressure vessel. The glass cylinder has a compressively stressed skin or layer which is engageable by a fragmentor pin or other sharp pointed member to fragmentize the entire glass member into very small fragments which are not sharp edged. Very little force is required on the pin in order to have the pin engage the stressed layer with sufficient force to fragmentize the glass member. Forces in the order of 8 inch-ounces can be sufficient.

A spring member is used to engage the fragmentor pin and this spring member is normally held out of engagement with the fragmentor pin by a detent or blocking arrangement, the position of which is controlled by the seating and unseating of the ball.

The primary object of this invention is to provide an improved self-actuated and controlled sensor and trigger mechanism for releasing a supply of pressure fluid to inflate a restraint cushion when a predetermined rate of acceleration change for a predetermined duration of time is attained. Another object of this invention is to provide a sensor and trigger mechanism for releasing a supply of pressure fluid from a sealed pressure vessel to inflate a restraint cushion wherein the trigger includes a hollow frangible glass cylinder having a compressively stressed skin or layer and separating movable and fixed members, one member including the pressure vessel having a penetratable seal and the other member including a seal penetrator. A further object of this invention is to provide a sensor and trigger mechanism for releasing a supply of pressure fluid from a sealed pressure vessel to inflate a restraint cushion wherein the seating and unseating of a ball with respect to a pedestal-type seat provides a sensor controlling a trigger which includes a fragmentor pin engageable under spring force with a compressively stressed skin or layer of a frangible glass cylinder separating movable and fixed members, one member including the pressure vessel having a penetratable seal sealing the cavity thereof and the other member including a penetrator for penetrating or rupturing the seal to release the pressure fluid and inflate the cushion.

Yet another object of this invention is to provide a sensor and trigger mechanism for releasing a supply of pressure fluid from a sealed pressure vessel to inflate a restraint cushion wherein the seal of the pressure vessel and a penetrator pin for rupturing the seal are separated by a hollow frangible glass cylinder having an outer compressively stressed skin or layer which is adapted to be engaged and penetrated by a fragmentor pin to provide a trigger which is controlled by a sensor which senses a rate of acceleration change for a predetermined period of time. Yet a further object of this invention is to provide a sensor and trigger mechanism for releasing a supply of pressure fluid from a sealed pressure vessel to inflate a restraint cushion wherein the trigger includes a penetrator normally held out of engagement with a penetratable seal of the pressure vessel by a hollow frangible glass cylinder having a compressively stressed outer skin or layer which is engageable by a movable fragmentor pin upon the application of a predetermined spring force thereto in order to fragmentize the glass cylinder and permit the seal and penetrator to interengage and inflate the cushion, with the application of the spring force being controlled by a sensor sensing a rate of acceleration change for a predetermined period of time.

These and other objects of this invention will be readily apparent from the following specification and drawings wherein:

FIG. 1 is a view partially in section of a sensor and trigger mechanism according to this invention, with the mechanism being shown in its normal position; and FIG. 2 is a view similar to FIG. 1 showing the mechanism in its actuated position wherein the pressure fluid has been released.

Referring now to FIG. 1 of the drawings, a housing designated generally 10 includes an annular walled chamber 12 defined by an annular base wall 14 and an annular sidewall 16. The opening defined by the wall 16 is closed by a cap 18 suitably secured to the upper edge of the wall 16.

The sensor mechanism includes a pedestal-type annular seat 20 fixedly secured to the wall 14 at approximately the center thereof. The seat 20 includes a spherical depression 22 which engages and seats a portion of the outer surface of a ball 24. A flat-headed screw 26 is threaded within a threaded embossment 28 of cap 18 and is engageable with ball 24 diametrically opposite the center of seat 20 to hold the ball within the depression with a predetermined force. The screw 26 is adjustable externally of the cap 18 by a conventional screwdriver to vary the force thereof on the ball.

In the specific embodiment shown, the ball has a ⅝-inch OD and weighs approximately 16 grams. The depression 22 has an OD of approximately one-fourth inch. The ball size and weight and the size and shape of the depression 22 are, of course, variable factors depending on the conditions under which the ball 24 is intended to move off the seat 20, as will be hereinafter discussed.

Another chamber 30 is formed integrally with chamber 10 and is defined by annular wall 14, spaced generally flat sidewalls 32, a lower wall 34, an annular wall 36 and a stepped end wall 38. The trigger mechanism includes an integral leaf spring designated 40 having angularly arranged arms 42 and 44 which follow the stepped contour of the wall 38. An arcuate juncture portion 45 is seated or fulcrumed on a like-shaped groove in the wall 34 and joins the arm 44 with a free arm 46 having a terminal portion 48. An arcuate juncture portion 50 fits within a like-shaped groove in the wall 38 and joins arm 42 with a free arm 52 which includes a return bent detention holding portion 54 and a terminal portion 56. The wall 14 and seat 20 are slotted at 58 to provide for passage of the arm 52 and portion 54 therethrough and the depression 22 is slotted so that the terminal portion 56 can seat underneath the ball 24 immediately adjacent the surface of the depression. The free positions of the arms 46 and 52 are respectively counterclockwise and clockwise of their positions shown in FIG. 2 so that these arms are always biased oppositely of each other about the juncture portions 45 and 50 respectively. The arms 42 and 44 are biased toward each other to grip the wall 38 when spring 40 is installed in chamber 30.

When the ball 24 is in its position shown in FIG. 1, it will be noted that the portion 54 of arm 52 engages the terminal portion 48 of arm 46 to act as a detent or holding means holding the arm 46 in its position as shown. When the arm 46 is in this position, it contains a stored spring energy or force. In the specific embodiment shown, this force is 8 inch-ounces.

The annular wall 36 defines an annular chamber which receives the threaded end of a sealed pressure vessel or cylinder 60 therewithin. A frustoconical mounting member 62 includes an annular threaded portion 64 into which the threaded end of cylinder 60 is inserted and an annular flange 66 which is generally located in opposed spaced relationship to an annular flange 68 defined by the wall 36. An annular member 70 surrounds the cylinder 60 and includes a stepped flange 72 which fits over the free edge of the wall 36 and is crimped over spaced lugs 74 of this wall at various spaced locations to thereby secure the member 70 to the housing 10. A coil compression spring 76 seats between the flange 66 of member 62 and a return bent flange 78 of the member 70 to continually bias the cylinder 60 and the mounting member 62 upwardly as viewed in FIGS. 1 and 2.

A hollow glass cylinder 80 seats between the flange 66 and the flange 68 to normally locate the cylinder 60 and the mounting member 62 against the action of the spring 76. The cylinder 80 is made of chemically treated glass which is commercially available under the name of Chem-cor. Such glass has a compressive stress placed in its outer layer as a result of chemical treatment. In the specific embodiment shown, the cylinder has a 1-inch OD and is one-half inch in axial length. The thickness of the cylinder is 0.080 in. and the stress layer is 0.017 in. thick on the outer surface, the inner surface, and the end surface. The stress layer is somewhat thicker at the inner and outer edges at the ends of the cylinder. Flange 68 is provided with a discontinuous rib 82 which engages the outer surface of cylinder 80 adjacent the outer upper edge thereof to locate the cylinder with respect to flange 68.

The annular wall 36 merges into an apertured annular base wall 83 and a hollow penetrator pin 84 is mounted within the aperture in the wall 83. The penetrator pin 84 opens to an annular chamber defined by the wall 36 and also to an annular passage or manifold 86 defined by the wall 83 and by an annular wall 88 of the housing. The manifold 86 opens to the interior of a suitable conduit 90 which is conventionally secured to the annular wall 88 and connects the manifold 86 with a conventional inflatable restraint cushion, not shown, which may be mounted at various conventional locations within a vehicle body.

Wall 36 is provided with an integral thickened rib which is grooved at 92 and interrupts flange 68 and rib 82. The base wall defining this groove is apertured at 94. A headed fragmentor pin 96 is slidably mounted within the aperture 94 and a resilient washer suitably secured to the rib of wall 36 opposite the base wall of groove 92 resiliently grips the shank of the pin to normally locate the pin, as shown in FIG. 1, with the headed end thereof located within the chamber 30 and the sharp pointed end thereof located within the groove 92 in a position to engage the outer upper edge of the cylinder 80.

As shown in FIG. 1, the housing 10 may be provided with various local flanges 98 so as to be mounted on a panel or wall 100 of a vehicle body. Preferably the body panel 100 is either a panel of the toe pan, firewall, or floor pan so as to receive shock waves transmitted through the body structure in the event of an impact between the vehicle and another object.

The ball 24 remains seated in depression 22 of seat 20 under the force of screw 26 during normal operation of the vehicle, despite the vehicle traveling over rough or uneven roads. The screw 26 is adjusted to hold the ball 24 in the depression 22 until the inertial load on the ball exceeds a predetermined minimum such as 10 G, for a predetermined period of time such as 8 to 10 milliseconds.

Should the vehicle impact with another object with sufficient force so that a shock wave of a certain magnitude for a certain duration of time is transferred through the body to the panel 100, the ball 24 slides out of the depression 22 and from underneath the head of screw 26 and moves off the seat 20 to its position shown in FIG. 2. In this position, the ball no longer constrains the spring arm 52 so that this arm moves slightly clockwise. The detent portion 54 of the arm 52 moves out of engagement with the terminal portion 48 of spring arm 46. Arm 46 then moves from its position of FIG. 1 to its position of FIG. 2 and portion 48 engages the head of the fragmentor pin 96 and moves the sharp pointed end of the pin into engagement with the outer upper edge of the glass cylinder 80. When the fragmentor pin engages the glass cylinder, the glass cylinder fragmentizes or breaks down into fragments, as shown in FIG. 2, and these fragments are generally spherical in nature.

As the glass cylinder fragmentizes, the spring 76 drives the cylinder 60 and the mounting member 62 upwardly from their position shown in FIG. 1 to their position shown in FIG. 2. In this position, the penetrator pin 84 has penetrated the rupturable or penetratable seal 102 of the cylinder 60 so that the pressure fluid, either air, nitrogen, or $CO_2$, contained within the cylinder 60 can flow through the penetrator pin and into the manifold 86 to inflate the cushion, not shown.

Although this embodiment of the invention shows the penetrator pin 84 as being fixed and the pressure vessel 60 as being movable, it is believed obvious that the pressure vessel could remain stationary and the penetrator pin be movable. Likewise, although the fragmentor pin 96 is shown as engaging an outer edge of the glass cylinder 80, this pin could likewise engage an inner edge, the outer surface of the glass cylinder, or the inner surface. It is preferable in some respects for the pin to engage a surface rather than an edge due to ease of access and also due to the fact that less force is required to fragmentize the cylinder when a surface is engaged since the compressively stressed layer is thicker at the edges as previously mentioned.

Thus, this invention provides an improved sensor and trigger mechanism.

We claim:

1. The combination comprising, a support, a vessel member containing pressure fluid and having a penetratable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow annular frangible glass member seated between the support and the movable member to hold the movable member against movement, the glass member having an annular compressively stressed layer, fragmentor means movably mounted on the support for engaging the compressively stressed layer of the glass member to fragmentize the glass member and permit the biasing means to move the penetrating member and vessel member seal into penetrating engagement and release the pressure fluid, stored energy means engageable with the fragmentor means to move the fragmentor means into engagement with the stressed layer of the glass member, releasable means normally blocking engagement of the stored energy means with the fragmentor means, and means for sensing a rate of acceleration change for a predetermined period of time for releasing the blocking means to permit the stored energy means to engage the fragmentor means.

2. The combination comprising, a support, a vessel member containing pressure fluid and having a penetratable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow annular frangible glass member seated between the support and the movable member to hold the movable member against movement, the glass member having an annular compressively stressed layer, fragmentor means movably mounted on the support for engaging the compressively stressed layer of the glass member to fragmentize the glass member and permit the baising means to move the penetrating member and vessel member seal into penetrating engagement and release the pressure fluid, spring lever means fulcrumed on the support and movable to a stored energy position, releasable means holding the spring lever means in stored energy position, and means for sensing a rate of acceleration change for a predetermined period of time for releasing the releasable means to permit the spring lever means to move from stored energy position and into engagement with the fragmentor means to move the fragmentor means into engagement with the stressed layer of the glass member.

3. The combination comprising, a support, a vessel member containing pressure fluid and having a penetratable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow cylindrical frangible glass member telescoped on the movable member and seated between the movable member and the support to hold the movable member and the fixed member against movement relative to each other, the glass member having a compressively stressed outer layer, a fragmentor pin movably mounted on the support for engaging the compressively stressed layer of the glass member to fragmentize the glass member and permit the biasing means to move the penetrating member and vessel member seal into penetrating engagement and release the pressure fluid, stored energy means engageable with the fragmentor pin to move the fragmentor pin into engagement with the glass member, releasable means blocking engagement of the stored energy means with the fragmentor pin, and means for sensing a rate of acceleration change for a predetermined period of time for releasing the blocking means to permit the stored energy means to engage the fragmentor pin.

4. The combination comprising, a support, an annular vessel member containing pressure fluid and having a penetratable seal, an annular penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, an annular seat on the movable member surrounding an annular portion thereof, a generally hollow annular frangible glass member telescoped over the annular portion of the movable member and seated between the annular seat and the support to hold the movable member and the fixed member against movement relative to each other, the glass member having an annular compressively stressed layer, a fragmentor pin movably mounted on the support for engaging the compressively stressed layer of the glass member to fragmentize the glass member and permit the biasing means to move the penetrating member and vessel member seal into penetrating engagement and release the pressure fluid, stored energy means engageable with the fragmentor pin to move the fragmentor pin into engagement with the glass member, releasable means blocking engagement of the stored energy means with the fragmentor pin, and means for sensing a rate of acceleration change for a predetermined period of time for releasing the blocking means to permit the stored energy means to engage the fragmentor pin.

5. The combination comprising, a support, a vessel member containing pressure fluid and having a penetratable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow annular frangible glass member seated between the support and the movable member to hold the movable member against movement, the glass member having an annular compressively stressed layer, fragmentor means movably mounted on the support for engaging the compressively stressed layer of the glass member to fragmentize the glass member and permit the biasing means to move the penetrating member and vessel member seal into penetrating engagement and release the pressure fluid, stored energy means engageable with the fragmentor means to move the fragmentor means into engagement with the stressed layer of the glass member, a generally frustoconically shaped pedestal on the support having a ball seat formed thereon, a ball of predetermined weight seated on said seat, means holding the ball against the seat with a predetermined force sufficient to require a rate of acceleration change for a predetermined period of time to unseat the ball from the pedestal, and means controlled by unseating of the ball for releasing the stored energy means to engage the fragmentor means.

6. The combination comprising, a support, a vessel member containing pressure fluid and having a penetratable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow annular frangible glass member seated between the support and the movable member to hold the movable member against movement, the glass member having an annular compressively stressed layer, fragmentor means movably mounted on the support for engaging the compressively stressed layer of the glass member to fragmentize the glass member and permit the biasing means to move the penetrating member and vessel member seal into penetrating engagement and release the pressure fluid, stored energy means engageable with the fragmentor means to move the fragmentor means into engagement with the stressed layer of the glass member, a generally frustoconically shaped pedestal on the support having a ball seat formed thereon, a ball of predetermined weight seated on said seat, means holding the ball against the seat with a predetermined force sufficient to require a rate of acceleration change for a predetermined period of time to unseat the ball from the pedestal, detent means movable between detented and undetented positions with respect to the stored energy means, and means controlled by unseating of the ball for moving the detent means to undetented position to permit the stored energy means to engage the fragmentor pin.

7. The combination comprising, a support, a vessel member containing pressure fluid and having a penetratable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow annular frangible glass member seated between the support and the movable member to hold the movable member against movement, the glass member having an annular compressively stressed layer, fragmentor means movably mounted on the support for engaging the compressively stressed layer of the glass member to fragmentize the glass member and permit the biasing means to move the penetrating member and vessel member seal into penetrating engagement and release the pressure fluid, stored energy means engageable with the fragmentor means to move the fragmentor means into engagement with the stressed layer of the glass member, a generally frustoconically shaped pedestal on the support having a ball seat formed thereon, a ball of predetermined weight seated on said seat, means holding the ball against the seat with a predetermined force sufficient to require a rate of acceleration change for a predetermined period of time to unseat the ball from the pedestal, detent means movable between detented and undetented positions with respect to the stored energy means, means biasing the detent means to undetented position, and means controlled by unseating of the ball for permitting the biasing means to move the detent means to undetented position to permit the stored energy means to engage the fragmentor pin.

8. The combination comprising, a support, a vessel member containing pressure fluid and having a penetratable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow annular frangible glass member seated between the support and the movable member to hold the movable member against movement, the glass member having an annular compressively stressed layer, fragmentor means movably mounted on the support for engaging the compressively stressed layer of the glass member to fragmentize the glass member and permit the biasing means to move the penetrating member and vessel member seal into penetrating engagement and release the pressure fluid, stored energy means engageable with the fragmentor means to move the fragmentor means into engagement with the stressed layer of the glass member, a generally frustoconically shaped pedestal on the support having a ball seat formed thereon, a ball of predetermined weight seated on said seat, means holding the ball against the seat with a predetermined force sufficient to require a rate of acceleration change for a predetermined period of time to unseat the ball from the pedestal, detent means movable between detented and undetented positions with respect to the stored energy means, means on the detent means engageable with the stored energy means and with the ball when the ball is seated to maintain the stored energy means out of engagement with the fragmentor pin, unseating of the ball permitting the detent means to release the stored energy means and permit the stored energy means to engage the fragmentor pin.

9. The combination comprising, a support, a vessel member containing pressure fluid and having a penetratable seal, a penetrating member for penetrating the seal to release the pressure fluid, means fixedly mounting one of the members on the support, means movably mounting the other member on the support, means biasing the movable member relative to the fixed member in a direction moving the penetrating member and vessel member seal into penetrating engagement with each other, a generally hollow annular frangible glass member seated between the support and the movable member to hold the movable member and the fixed member against movement relative to each other, the glass member having an annular compressively stressed layer, a fragmentor pin movably mounted on the support for engaging the compressively stressed layer of the glass member to fragmentize the glass member and permit the biasing means to move the penetrating member and vessel member seal into penetrating engagement and release the pressure fluid, a spring member mounted on the support and including a first arm engageable with the fragmentor pin and a second arm engageable with the first arm to hold the first arm against movement, a generally frustoconically shaped pedestal on the support having a ball seat formed thereon, a ball of predetermined weight seated on said seat, means holding the ball against the seat with a predetermined force sufficient to require a rate of acceleration change for a predetermined period of time to unseat the ball from the pedestal, means on the second arm engageable with the ball when the ball is seated to maintain the second arm in engagement with the first arm, unseating of the ball permitting the second arm to move out of engagement with the first arm to permit the first arm to engage the fragmentor pin.